(12) United States Patent
Nakazawa (10) Patent No.: US 8,146,168 B2
(45) Date of Patent: Mar. 27, 2012

(54) PROGRAM CONTROL APPARATUS, METHOD AND PROGRAM

(75) Inventor: Toshiyuki Nakazawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 853 days.

(21) Appl. No.: 12/238,428

(22) Filed: Sep. 25, 2008

(65) Prior Publication Data

US 2009/0092256 A1 Apr. 9, 2009

(30) Foreign Application Priority Data

Oct. 3, 2007 (JP) .................................. 2007-260361

(51) Int. Cl.
*G06F 21/22* (2006.01)

(52) U.S. Cl. .............. 726/30; 726/27; 713/176; 705/51; 705/59

(58) Field of Classification Search .................. None
See application file for complete search history.

(56) References Cited

U.S. PATENT DOCUMENTS

| | | | | |
|---|---|---|---|---|
| 2003/0181242 A1* | 9/2003 | Lee et al. | .......................... | 463/42 |
| 2007/0130073 A1* | 6/2007 | Celli et al. | ...................... | 705/51 |
| 2007/0150417 A1* | 6/2007 | Hu | .................................. | 705/59 |
| 2007/0244824 A1* | 10/2007 | Motley et al. | .................... | 705/59 |
| 2008/0115124 A1* | 5/2008 | Remer | .......................... | 717/178 |

FOREIGN PATENT DOCUMENTS

JP 2005-78167 A 3/2005

OTHER PUBLICATIONS

Electronic License Management—The Future of Software Licensing, SafeNet, 2003.*

* cited by examiner

*Primary Examiner* — Minh Dinh
(74) *Attorney, Agent, or Firm* — Rossi, Kimms & McDowell LLP (57) ABSTRACT

An activation restriction confirmation processing unit concatenates the basic portion of the name of an activation-restricted program and constituent information indicating a destination, specifies the activation-restricted program that is to be an expansion program of a basic program, and determines whether this activation-restricted program is included in a group of expansion programs. If it is included, the activation-restricted program is loaded. If loading succeeds, then signature data included in this program is read out. The signature data is decrypted using a public key, and confirmation information obtained by decryption is checked against information that is the result of concatenating the identification information of the expansion program and the constituent information indicating the destination. If there is a match, then this activation-restricted program is installed. If there is a non-match, then processing is suspended.

9 Claims, 7 Drawing Sheets

PROGRAM CONTROL APPARATUS, METHOD AND PROGRAM

BACKGROUND OF THE INVENTION

1. Field of the Invention

The present invention relates to a program control apparatus, method and program for restricting activation of an expansion program, which operates under a basic program, based upon the combination of the basic program and expansion program.

2. Description of the Related Art

A large number of applications have been filed on license management methods as methods of controlling program activation. For example, software to undergo license management is encrypted and, based upon information such as a license number that has been input by a user, a license issuance server issues a key for decrypting the software. A license management service receives the key and decrypts the software that is the object of license management. At this time, by using information specific to a machine on which the license management service runs, execution of the software by another machine is inhibited (e.g., see the specification of Japanese Patent Application Laid-Open No. 2005-78167).

Further, a DVD player is an example of an apparatus in which a regional limitation is implemented. Playback of DVD video is inhibited in a DVD player if a region code of the DVD player and a region code of DVD video do not match.

However, the prior art described above cannot deal with a situation in which the license scheme of expansion software differs for every destination. For example, there are cases where an expansion program distributed free of charge in a specific region is sold under license in another region. In such cases, activation of an expansion program distributed freely in another region cannot be suppressed in a region in which the program is sold under license. As a consequence, a program that rightfully should be available for pay can be utilized free of charge.

DVD players implement a regional playback restriction. However, only one region code can be recorded on one medium. Consequently, it is difficult to apply this technique to a package that provides an expansion program intended for a plurality of destinations by a single medium, by way of example. Further, although a DVD has its content subjected to copy control, a region code is not subjected to encryption or signature. This means that in a case where a medium not subjected to copy control is used as a medium for supplying software, inappropriate lifting of the regional restriction becomes possible as by forging a region code.

SUMMARY OF THE INVENTION

The present invention has been devised in view of the prior art described above and seeks to provide an expansion program intended for a plurality of destinations as well as a program control apparatus, method and program that make it possible to implement restriction of activation specific to each of the destinations.

According to the present invention, the foregoing object is attained by providing a program control apparatus for restricting activation of an expansion program that expands the functions of a basic program, the apparatus comprising: a specifying unit configured to specify an expansion program, which is to be activated, based upon identification information of a designated expansion program and correspondence information, which is possessed by the basic program, indicating correspondence between the basic program and the expansion program; a decryption unit configured to decrypt signature information, which is included in the specified expansion program to be activated and which has been obtained by encrypting the identification information of the expansion program and the correspondence information using a secret key, the signature information being decrypted using a public key that corresponds to the secret key; a checking unit configured to check the decrypted information, which has been decrypted by the decryption unit, against the identification information of the expansion program and the correspondence information; and a unit configured to enable execution of the expansion program, which has been specified by the specifying unit, if result of the check performed by the checking unit indicates a match.

The present invention, by restricting activation of an expansion program in accordance with constituent information of a basic program, makes it possible to solve the aforementioned problem, namely activation of an expansion program that rightfully should not be activated.

Further features of the present invention will become apparent from the following description of exemplary embodiments with reference to the attached drawing.

DESCRIPTION OF THE EMBODIMENTS

First Embodiment

<Software Configuration>

Figure 1:
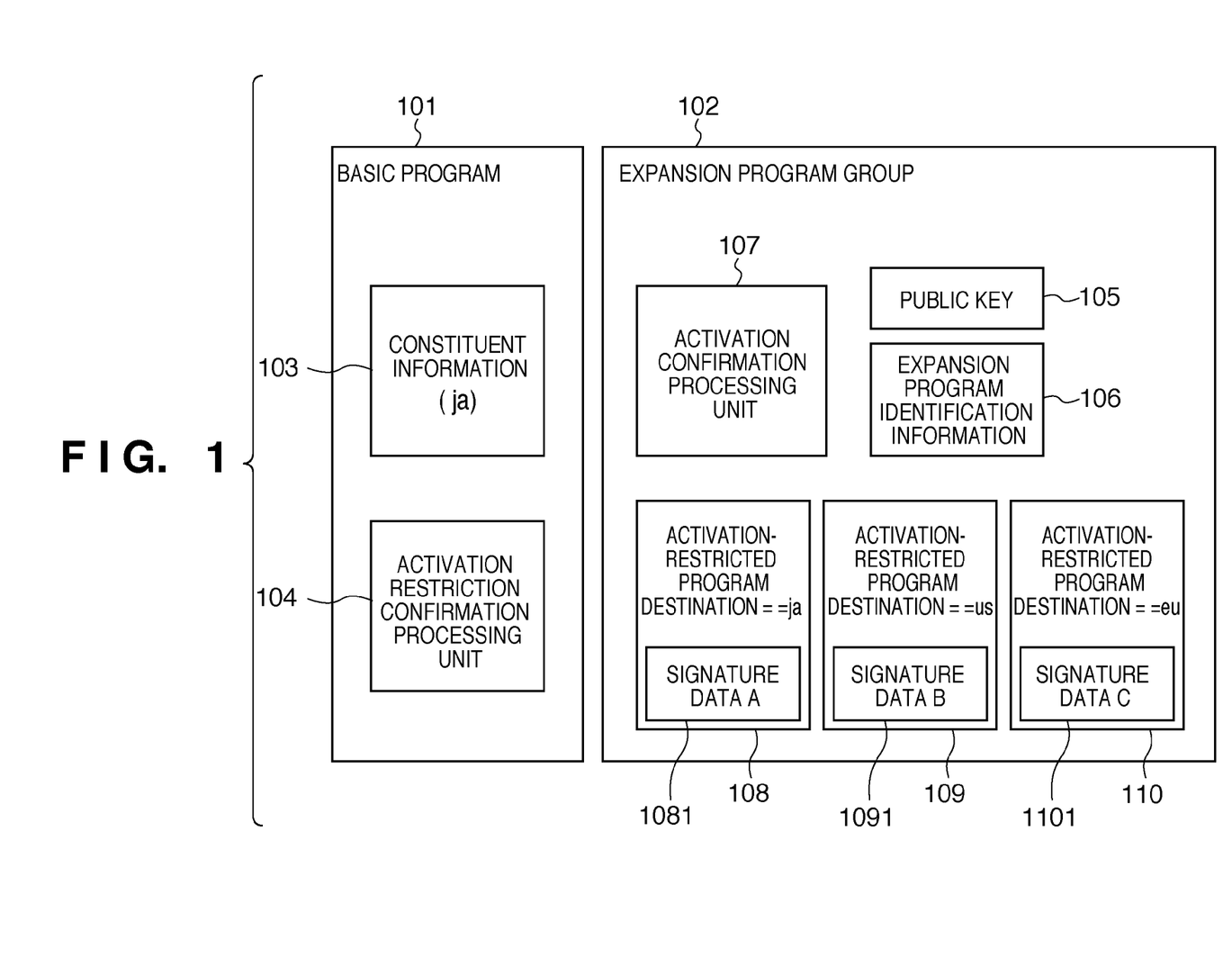
FIG. 1 is a block diagram of programs equipped with a scheme for limiting activation of an expansion program running under a basic program according to a first embodiment of the present invention.

FIG. 1 is a block diagram of programs equipped with a scheme for limiting activation of an expansion program that runs under a basic program according to a first embodiment of the present invention. In FIG. 1, an expansion program group 102 operates under a basic program 101 in order to expand the functions of the basic program 101. The expansion program group 102 operates while the functions provided by the basic program 101 are being used. The basic program 101 is executed by a computer. The expansion program group 102 is provided by, for example, a storage medium. In accordance with selection by a user and support of the basic program 101, a suitable activation-restricted program is installed in the computer as an expansion program and is executed. The expansion program group 102 includes a group of expansion programs the destinations of which are different countries or regions but the functions of which are the same. That is, the expansion program group 102 includes programs having the same identification information and different correspondence information.

Constituent information 103 is the information that constitutes the basic program 101. In this example, program destination information is used as the constituent information. In this example, the destination of the basic program 101 is Japan ("ja"). In this example, the constituent information is correspondence information indicating correspondence with an expansion program. More specifically, an expansion program intended for a certain destination is executed as an add-on of the basic program for the same destination. In FIG. 1, the term "expansion program group" is a generic term that covers individual expansion programs (referred to as activation-restricted programs in FIG. 1) intended for a plurality of destinations. With regard to an activation-restricted program, the destination is described as part of the name of the program.

An activation restriction confirmation processing unit 104 is a program module called from an activation confirmation processing unit 107 of the expansion program group 102. A public key 105 is a public key that is specific to the expansion program group 102. The public key 105 is used to authenticate an activation-restricted program (i.e., an expansion program). More specifically, the public key 105 is used in decrypting a digital signature (referred to as "signature information" or "signature data") that was encrypted using a secret key corresponding to the public key 105. The public key 105 is applied in common at least with regard to the individual expansion programs included in the expansion program group 102. Expansion program identification information 106 is information for uniquely identifying the expansion program group and uses, for example, the name of the expansion program group or an identifier generated automatically using random numbers or the like. In this embodiment, the expansion program identification information is different from the basic portion of the identification information of the individual expansion programs, although it may just as well be the same.

The activation confirmation processing unit 107 is a program module for confirming whether an expansion program is capable of being run under the basic program 101. The activation confirmation processing unit 107 determines whether or not to activate in accordance with the result of calling the activation restriction confirmation processing unit 104 of the basic program 101. Activation-restricted programs 108, 109, 110 are included in the expansion program group 102 and are turned on in the basic program 101 to expand the functions thereof. These are individual expansion programs intended for the respective destinations. These expansion programs are stored on a storage medium as program files. That is, there are also cases where an activation-restricted program is simply referred to as an expansion program.

It is possible for a plurality of activation-restricted programs to be included in the expansion program group in correspondence with the constituent information 103 of the basic program 101. In this example, activation-restricted programs corresponding to "ja" (Japan), "us" (United States) and "eu" (Europe) as destinations are included in the expansion program group 102. An activation-restricted program has the form of a dynamic link library and the name thereof includes a basic portion, the respective destination information and an extension indicating that this is a library. For example, if the basic name of an activation-restricted program in the illustrated example is ExtPrg, then the file names of the activation-restricted programs 108, 109, 110 will be ExtPrg.ja.dll, ExtPrg.us.dll and ExtPrg.eu.dll, respectively. The destination information included in the name of an activation-restricted program can also be referred to as correspondence information indicating correspondence with the basic program.

Signature data 1081, 1091, 1101 obtained by encrypting program-specific information using the secret key that is paired with the public key 105 is contained in the activation-restricted programs 108, 109, 110, respectively. The program-specific information is generated from the expansion program identification information 106 and the destination information of each activation-restricted program. The specific information is produced by concatenating these items of information, by way of example.

The expansion program group 102 is stored on a storage medium such as a Compact Disk (registered trademark) and is provided to the user. Accordingly, a plurality of expansion programs having a plurality of countries or regions as their destinations would be stored on this storage medium.

<Computer Configuration>

Figure 2:
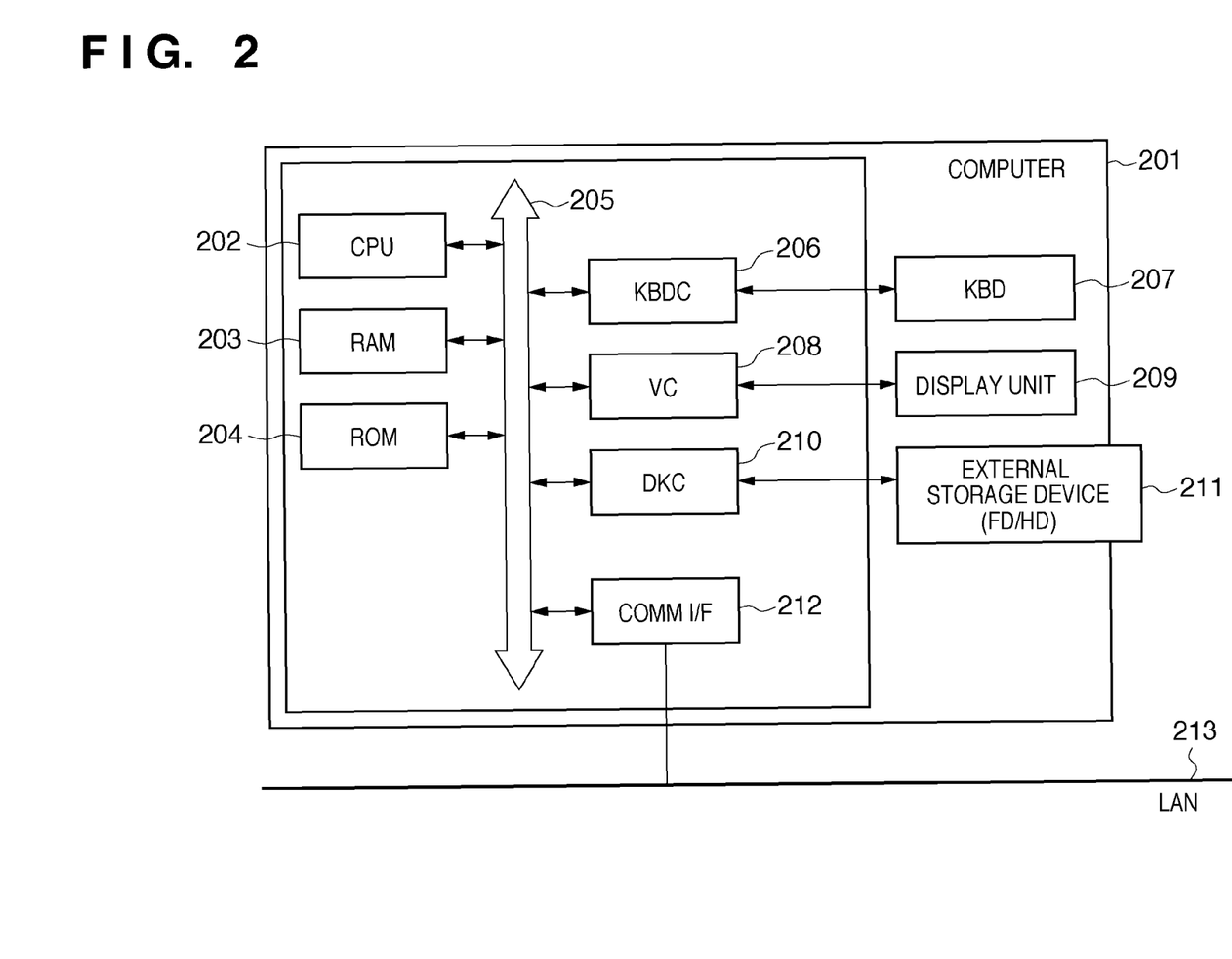
FIG. 2 is a block diagram illustrating the hardware configuration of a host computer on which programs are run.

FIG. 2 is a block diagram illustrating the hardware configuration of a host computer 201 on which the basic program 101 and expansion program group 102 are run. As shown in FIG. 2, the host computer 201 includes a CPU 202, a RAM 203, a ROM 204 and an external storage device 211. The CPU 202 executes software that has been stored in the ROM 204 or external storage device 211 and controls each device connected to a system bus 205. The RAM 203 functions as the main memory or work area of the CPU 202. The external storage device 211 has a hard disk (HD), optical disk or flexible disk (FD). The external storage device 211 stores a booting program, an operating system, various applications including an authentication server and authentication client, database data, font data and user files, etc.

A keyboard controller (KBDC) 206 of the host computer 201 sends the CPU 202 input information from a keyboard (KBD) 207 or pointing device (not shown). A video controller (VC) 208 controls display presented on a display unit 209 comprising a CRT of LCD, etc. A disk controller (DKC) 210 controls access to the external storage device 211. A communication controller (COMM I/F) 212 is an interface that connects the computer to a local-area network (LAN) 213.

<Processing for Installing Expansion Programs>

Figure 3:
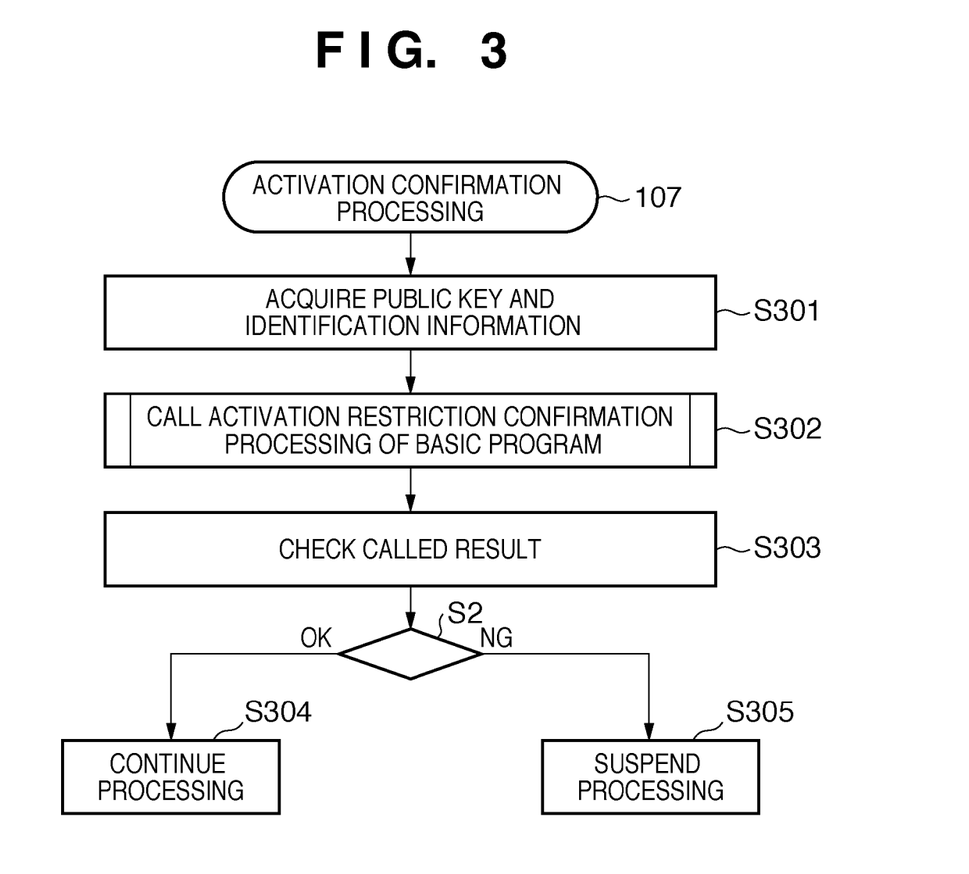
FIG. 3 is a flowchart illustrating processing executed by an activation confirmation processing unit of an expansion program.

Processing executed by the activation confirmation processing unit 107 and activation restriction confirmation processing unit 104 will be described with reference to a flowchart. FIG. 3 is a flowchart illustrating processing executed by the activation confirmation processing unit 107 included in the expansion program group 102. When the medium on which the expansion program group 102 has been recorded is read by the computer, the activation confirmation processing unit 107 is loaded and executed. FIG. 3 illustrates the ensuing processing. The activation confirmation processing unit 107 is program code that has been recorded on the medium. By executing this code using the computer, the activation confirmation processing unit 107 that functions according to the procedure of FIG. 3 is implemented.

First, in step S301, the public key 105 specific to the expansion program and the expansion program identification information 106 are extracted. In step S302, the activation restriction confirmation processing unit 104 of the basic program 101 is called with the extracted public key 105 and expansion program identification information 106 and the basic name of the activation-restricted program serving as parameters. For example, the public key 105 is a binary code string.

The expansion program identification information 106 is a string of characters or numerals such as "External Program", and the basic name of the activation-restricted program also is an alphanumeric string such as "ExtPrg". As a result of calling the activation restriction confirmation processing unit 104, whether or not activation of the expansion program is to be performed in sent back. In step S303, therefore, the value sent back is checked. If activation is possible, processing of the expansion program group 102 is continued in step S304. If the result of the check is that activation is not possible, processing of the expansion program group 102 is suspended in step S305. At this time it is permissible to execute processing such as that for notifying the user of the fact that the expansion program could not be activated. If processing of the expansion program group 102 is continued, then, by way of example, the activation-restricted program specified in step S302 is installed in the computer and is rendered executable immediately as the expanded portion of the basic program 101 in a case where the designated function is carried out.

Figure 4:
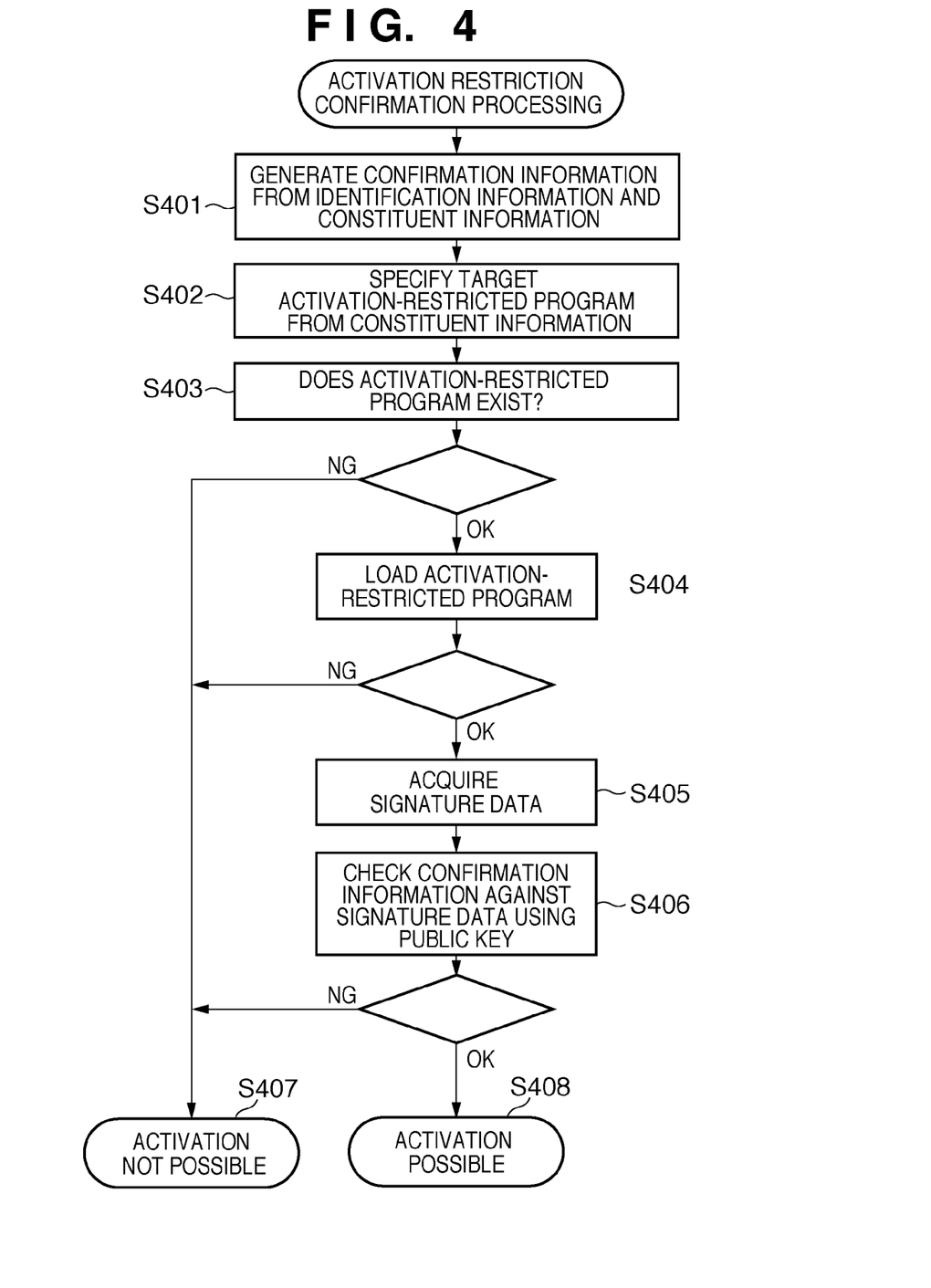
FIG. 4 is a flowchart illustrating processing executed by an activation restriction confirmation processing unit of a basic program according to the first embodiment.

FIG. 4 is a flowchart illustrating processing executed by the activation restriction confirmation processing unit 104 of the basic program 101. The activation restriction confirmation processing unit 104 is called together with the public key 105 of the expansion program, expansion program identification information 106 and basic name (e.g., "ExtPrg") of the activation-restricted program in step S302 implemented by the activation confirmation processing unit 107.

First, in step S401, confirmation information is generated from the delivered expansion program identification information 106 ("External Program") and constituent information 103 (e.g., "ja") of the basic program. Next, in step S402, the activation-restricted program that will be the expansion program is determined from the basic name of the activation-restricted program and the constituent information 103 of the basic program. In the case of this example, the name of the activation-restricted program is "ExtPrg" and the constituent information 103 is "ja", and therefore "ExtPrg.ja.dll" is decided upon as the activation-restricted program. Here ".dll" is an extension indicative of library and is added on fixedly. In step S403, it is determined whether the activation-restricted program having the name determined in step S402 exists in the expansion program group 102. If the activation-restricted program does not exist, it is determined that the designated expansion program cannot be activated and, in step S407, a message to the effect "ACTIVATION NOT POSSIBLE" is sent back to the calling source.

If the activation-restricted program having the name determined in step S402 exists, then the applicable activation-restricted program (library) is loaded in step S404. In this example, the activation-restricted program 108 applies. If loading of the activation-restricted program fails, then the message to the effect "ACTIVATION NOT POSSIBLE" is sent back to the calling source in step S407. If loading succeeds, in step S405, signature data is extracted from the activation-restricted program 108 that has been loaded. In this example, the signature data 1081 included in the activation-restricted program 108 is extracted.

In step S406, the confirmation information generated in step S401 is checked against the signature data, which has been extracted in step S405, using the public key 105 delivered from the activation confirmation processing unit 107 of the expansion program group 102. The public key 105 is the key corresponding to the secret key that was used in encryption at the time the signature data was created. A public key corresponding to a secret key is a key for decoding a code encrypted by the secret key, or vice versa. The above-mentioned check is performed as follows, by way of example: The signature data is decoded using the public key and the specific information is decrypted. The specific information obtained is checked against the confirmation information generated in step S401. The specific information includes identification information and destination information (constituent information) of the program rightfully to be employed as the expansion program of the basic program 101, these items of information being obtained from the information concerning the basic program 101. Accordingly, if the compared items of information match, it is determined that the expansion-program identification information and the constituent information have not been altered and that the activation-restricted program specified in step S402 is a valid program capable of being utilized as an expansion program of the basic program 101. In this case, therefore, the check succeeds. If there is no match, on the other hand, then it is determined that there is the danger that either the identification information of this expansion program or the destination information included in the file name of the program has been altered. In this case, therefore, the check fails.

If the check succeeds, information to the effect that activation is possible is sent back in step S408 to the source that called for this processing. If the check fails, information to the effect that activation is not possible is sent back in step S407 to the source that called for this processing. If the check succeeds by virtue of the procedure shown in FIG. 3, the applicable activation-restricted program is installed in the computer as the expansion program corresponding to the basic program 101 and execution is enabled.

Thus, in accordance with this embodiment, a part of information that forms the basis of a digital signature is used as destination information and, hence, alteration of destination can be prevented. As a result, activation of an expansion program can be restricted in accordance with constituent information of the basic program and it is possible to solve the problem of activation of an expansion program that rightfully should not be activatable.

Second Embodiment

Figure 5:
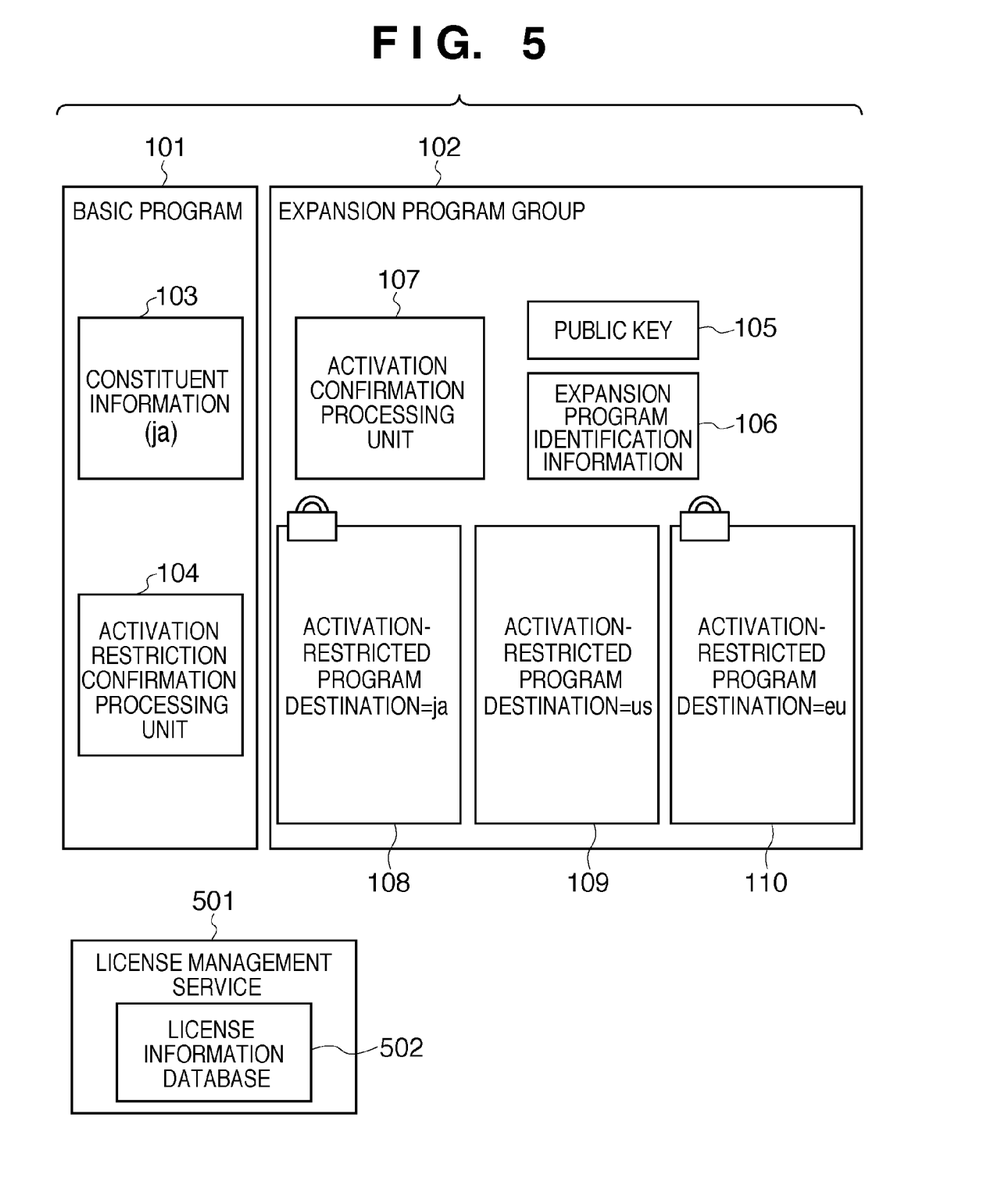
FIG. 5 is a block diagram of a program equipped with a scheme for limiting activation of an expansion program under a basic program according to a second embodiment of the present invention.

A second embodiment of the present invention deals with a case where an activation-restricted program of the first embodiment is under the management of license control. FIG. 5 is a block diagram of a program equipped with a scheme for limiting activation of an expansion program under a basic program according to a second embodiment of the present invention. The arrangement of FIG. 5 is obtained by adding a license management service 501 to the arrangement of FIG. 1. As other components are identical with those of the first embodiment, diagrams used in describing the first embodiment will be utilized here as is. Further, each activation-restricted program includes signature data, although the signature data is deleted from FIG. 5.

The license management service 501 has an internally provided license information database 502 and stores information, for example, a decryption key, relating to a license presently registered in the license management server. An overview of operation of license management according to this embodiment will be set forth below. An activation-restricted program to undergo license management has been encrypted by the license management system. In the example of FIG. 5, the activation-restricted program 108 and the activation-restricted program 110, which have been locked, have been encrypted and the activation-restricted program 109 has not been encrypted. That is, the expansion programs intended for Japan and Europe have been licensed for sale and the expansion program intended for the USA is distributed free of charge.

By purchasing the license, a user acquires the license number from the source that supplies the expansion application. The user further sends the license issuance server (not shown) the license number and a host computer identifier that uniquely identifies the host computer on which the application will run. The license issuance server is a server for issuing a license provided by the source that supplies the license. The license issuance server creates a key, which is for decrypting the activation-restricted program (program 108 in this example), from the license number and host computer identifier and sends the key to the user. The CPU ID of the host computer or the identification number of the hard disk, etc., is used as the host identifier that uniquely identifies the host computer. The user registers the key, which has been issued by the license issuance server, in the license management server 501 as license information. The license management server 501 stores the registered key in the license information database 502. The key can be registered in association with the user, in association with the program identification information or in association with the specific information.

Figure 7:
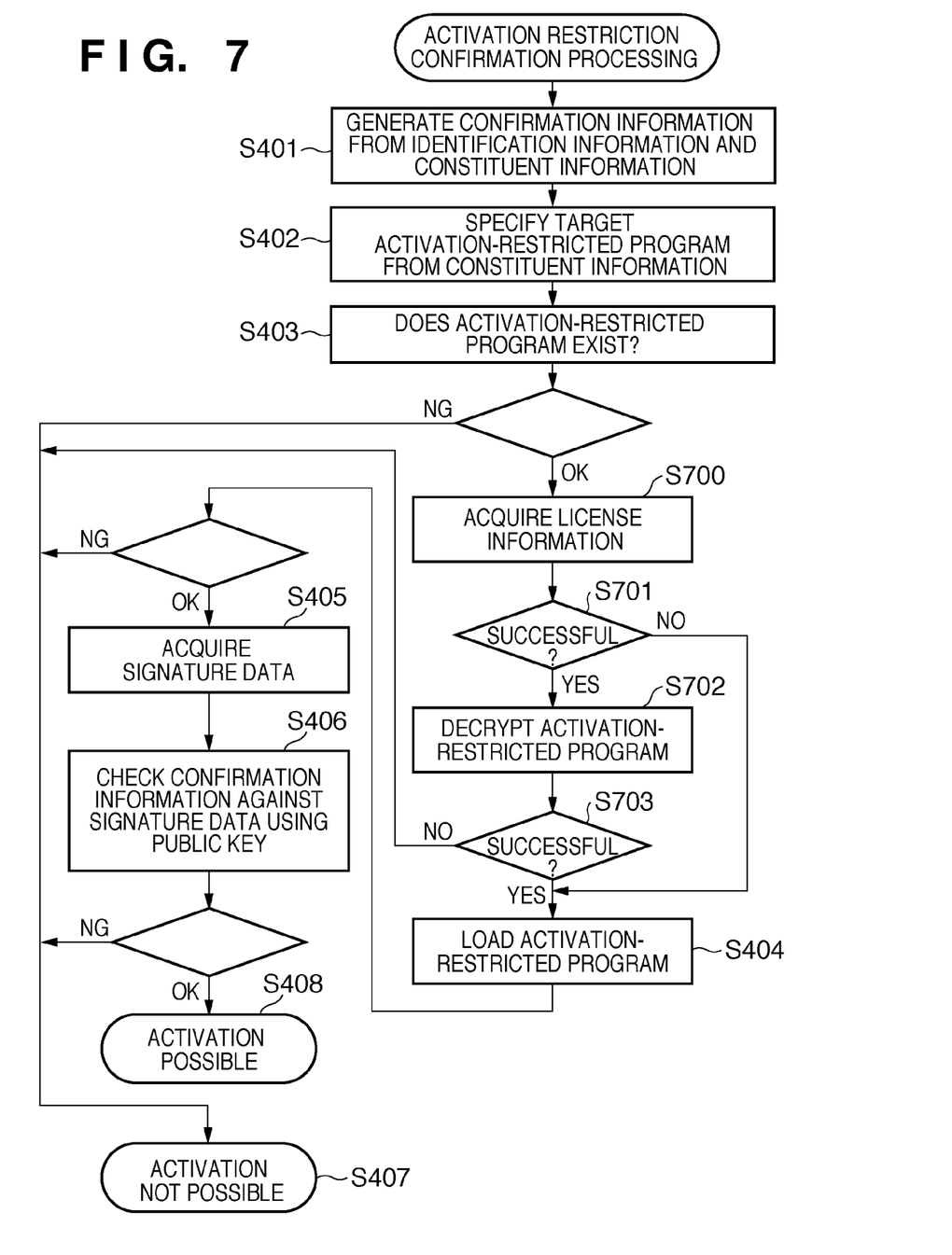
FIG. 7 is a flowchart illustrating processing executed by an activation restriction confirmation processing unit of a basic program according the second embodiment.

The procedure for installing the expansion program is as illustrated in FIGS. 3 and 7. FIG. 3 is commonly referred in the first embodiment.

FIG. 7 is a flowchart illustrating processing executed by the activation restriction confirmation processing unit 104 of the basic program 101. The activation restriction confirmation processing unit 104 is called together with the public key 105 of the expansion program, the expansion program identification information 106 and the basic name (e.g., "ExtPrg") of the activation-restricted program in step S302 implemented by the activation confirmation processing unit 107. Steps in FIG. 7 similar to those in FIG. 4 are identified by like step numbers and need not be described again. FIG. 7 differs from FIG. 4 in that if a specified activation-restricted program is found to exist in step S403, license authentication is performed by the processing of steps S700 to S703.

In step S700, an attempt is made to acquire the applicable key, that is, the license information, from the license management server 501. Since the key has been registered in association with the user, in association with the program identification information or in association with the specific information, the key acquired using these associations is specified. In step S701, it is determined whether acquisition of the applicable key, that is, license information, has succeeded. If acquisition succeeds, control branches to step S702, where use is made of the license information in an attempt to decode (decrypt) the activation-restricted program specified in step S402. Whether this attempt has succeeded or not is determined in step S703. If the attempt succeeds, control proceeds to step S404, where the activation-restricted program that has been decrypted is loaded. If the attempt fails, on the other hand, then information to the effect that activation is not possible is sent back to the calling source and processing is exited. It should be noted that decryption success can be determined by embedding a prescribed character string in the original data and then checking this character string, by way of example.

As a result, decryption of the encrypted activation-restricted program 108 is performed at loading of the activation-restricted program and, if the correct license information has not been registered in the license management server, then loading fails. Further, since the activation-restricted program 109 that is not under license management has not been encrypted, loading of this program succeeds even without license information.

In a case where this expansion program is run under a basic program intended for the USA, for example, it is possible to run the program even without a license. However, in a case where this expansion program is run under a basic program intended for Europe, the expansion program cannot be activated if the license has not been registered. Furthermore, even if the file name of an activation-restricted program intended for the USA is changed to a file name intended for Europe, the signature check in step S406 will fail and, hence, the expansion program cannot be activated.

Thus, license management on a per-destination basis can be implemented. This supplements the effects of the first embodiment.

Figure 6:
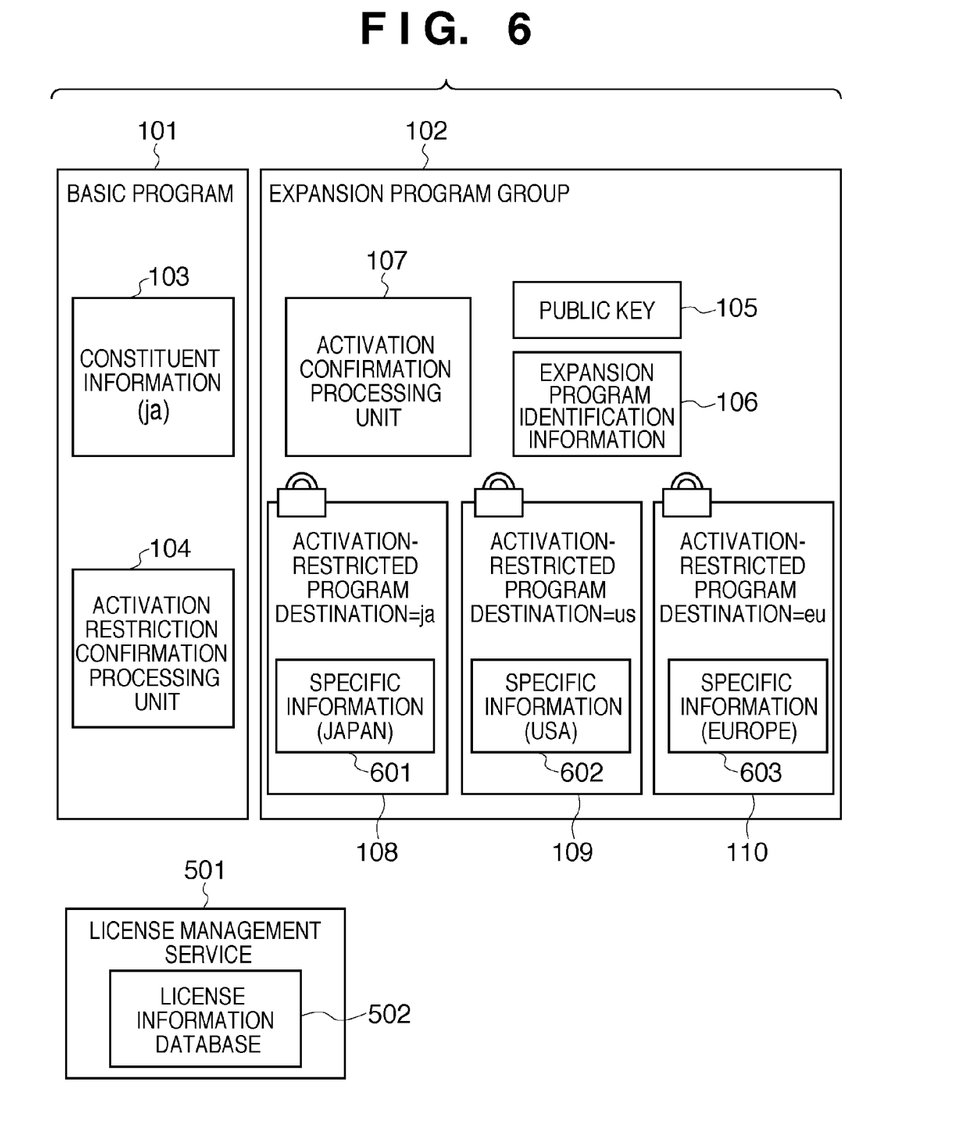
FIG. 6 is a block diagram illustrating a variation of a program equipped with a scheme for limiting activation of an expansion program under a basic program.

It should be noted that the expansion programs include specific information 601, 602, 603 for every destination of the basic program, as illustrated in FIG. 6. The specific information 601, 602, 603 for every destination involves data and processing that differ for every destination, and the expansion program group 102 executes processing using this data and processing. Examples of specific information that can be mentioned are bit length of the key used by the encryption algorithm and the processing according to the main body of the encryption algorithm. For example, it is possible to limit encryption key length to 512 bits in the USA, 256 bits in Japan and 128 bits in certain specific regions. Further, as for the encryption scheme, it is possible to make Rijndael compulsory in Japan and the USA and make DES compulsory in certain specific regions.

Management of an expansion program added onto a basic program is taken as an example in the first and second embodiments. However, the present invention is also applicable to cases where the basic program is regarded as the operating system and the expansion program is regarded as another program that runs under this operating system. In other words, the present invention is applicable in a case where the basic program includes an operating system and the expansion program includes a program other than an operating system, such as an application or driver that operates under the operating system.

The present invention may be applied to a system constituted by a plurality of devices (e.g., a host computer, interface, reader, printer, etc.) or to an apparatus comprising a single device (e.g., a copier or facsimile machine, etc.). Further, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes. In this case, the program codes read from the recording medium implement the novel functions of the embodiments and the recording medium storing the program codes constitutes the invention.

Further, it goes without saying that the present invention also covers a case where an operating system or the like running on the computer performs a part of or the entire process in accordance with the designation of program codes and implements the functions according to the embodiments. The present invention is applied also to a case where program codes read from the recording medium are written to a memory provided on a function expansion card inserted into the computer or a memory provided in a function expansion unit connected to the computer. In this case, a CPU or the like provided on the function expansion card or function expansion unit performs a part of or the entire actual process based upon the designation of written program codes and implements the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-260361, filed Oct. 3, 2007, which is hereby incorporated by reference herein in its entirety.

What is claimed is:

1. A program control apparatus for restricting activation of an expansion program that expands the functions of a basic program, said apparatus comprising:
   a specifying unit configured to specify a target program, which is to be activated, based upon identification information of a designated expansion program and constituent information of the basic program;
   a decryption unit configured to decrypt signature information, which is included in the target program and which has been obtained by encrypting the identification information of the expansion program and constituent information using a secret key, the signature information being decrypted using a public key that corresponds to the secret key;
   a checking unit configured to check the decrypted information, which has been decrypted by said decryption unit, against the identification information of the designated specified expansion program and the constituent information of the basic program; and
   a unit configured to enable, for expanding the basic program, execution of the target program, which has been specified by said specifying unit, if result of the check performed by said checking unit indicates a match, and to disable execution of the target program, which has been specified by said specifying unit, if result of the check performed by said checking unit indicates a non-match.

2. The apparatus according to claim 1, wherein the constituent information is identification information that identifies destination of the program.

3. The apparatus according to claim 1, wherein a plurality of expansion programs having the same identification information have been stored on a single storage medium; and
   said specifying unit specifies, as the target program, an expansion program which corresponds to combination information of the identification information of the plurality of expansion programs and the constituent information of the basic program from among the plurality of expansion programs.

4. The apparatus according to claim 1, further comprising a loading unit configured to determine whether entered license information is valid and, if the license information is valid, to load the target program specified by said specifying unit in a memory;
   wherein said decryption unit decrypts the signature information included in the loaded target program; and
   said checking unit checks the decrypted information decrypted by said decryption unit against identification of the designated expansion program and the constituent information of the basic program.

5. A non-transitory computer-readable storage medium storing a basic program for causing a computer to execute a program control method of restricting activation of an expansion program that is capable of expanding the functions of the basic program, said method comprising:
   a specifying step of specifying a target program, which is to be activated, based upon identification information of a designated expansion program and constituent information of the basic program;
   a decryption step of decrypting signature information, which is included in the target program and which has been obtained by encrypting the identification information of the expansion program and the constituent information using a secret key, the signature information being decrypted using a public key that corresponds to the secret key;
   a checking step of checking the decrypted information, which has been decrypted at said decryption step, against the identification information of the designated specified expansion program and the constituent information of the basic program; and
   a step of enabling, for expanding the basic program, execution of the target program, which has been specified at said specifying step, if result of the check performed at said checking step indicates a match, and to disable execution of the target program, which has been specified at said specifying step, if result of the check performed at said checking step indicates a non-match.

6. A program control method of restricting activation of an expansion program, which expands the functions of a basic program, by a computer, said method comprising:
   a specifying step of specifying a target program, which is to be activated, based upon identification information of a designated expansion program and constituent information of the basic program;
   a decryption step of decrypting signature information, which is included in the target program and which has been obtained by encrypting the identification information of the expansion program and constituent information using a secret key, the signature information being decrypted using a public key that corresponds to the secret key;
   a checking step of checking the decrypted information, which has been decrypted at said decryption step, against the identification information of the designated specified expansion program and the constituent information of the basic program; and
   a step of enabling, for expanding the basic program, execution of the target program, which has been specified at said specifying step, if result of the check performed at said checking step indicates a match, and to disable execution of the target program, which has been specified at said specifying step, if result of the check performed at said checking step indicates a non-match.

7. The method according to claim 6, wherein the constituent information is identification information that identifies destination of the program.

8. The method according to claim 6, wherein a plurality of expansion programs having the same identification information have been stored on a single storage medium; and
   said specifying step specifies, as the target program, an expansion program which corresponds to combination information of the identification information of the plurality of expansion programs and the constituent information of the basic program from among the plurality of expansion programs.

9. The method according to claim 6, further comprising a loading step of determining whether entered license information is valid and, if the license information is valid, to load the target program specified by said specifying unit in a memory;
   wherein said decryption step decrypts the signature information included in the loaded target program; and
   said checking step checks the decrypted information decrypted at said decryption step against identification of the designated expansion program and the constituent information of the basic program.

* * * * *